US008311787B2

(12) United States Patent
Ganvir et al.

(10) Patent No.: US 8,311,787 B2
(45) Date of Patent: Nov. 13, 2012

(54) POLYMER MELT EXTRUSION WHICH HAS POTENTIAL USE IN DIE DESIGN

(75) Inventors: Vivek Ganvir, Pune (IN); Gautham Purushottham Basavarsu, Pune (IN); Lele Ashish, Pune (IN); Thaokar Rochish, Mumbai (IN)

(73) Assignee: Tata Consultancy Services Ltd., Mumbai (IN)

( * ) Notice: Subject to any disclaimer, the term of this patent is extended or adjusted under 35 U.S.C. 154(b) by 804 days.

(21) Appl. No.: 12/378,730

(22) Filed: Feb. 19, 2009

(65) Prior Publication Data

US 2009/0210189 A1    Aug. 20, 2009

(30) Foreign Application Priority Data

Feb. 19, 2008   (IN) .......................... 359/MUM/2008

(51) Int. Cl.
 *G06G 7/50* (2006.01)
(52) U.S. Cl. ........................................................... 703/9
(58) Field of Classification Search ........................ 703/9
 See application file for complete search history.

(56) References Cited

U.S. PATENT DOCUMENTS

| | | | | |
|---|---|---|---|---|
| 5,350,547 A | * | 9/1994 | Yamaguchi et al. | 264/40.1 |
| 5,572,434 A | * | 11/1996 | Wang et al. | 700/197 |
| 5,581,468 A | * | 12/1996 | White et al. | 700/204 |
| 5,760,779 A | * | 6/1998 | Yamashita et al. | 345/421 |
| 5,835,379 A | * | 11/1998 | Nakano | 700/197 |
| 5,874,034 A | | 2/1999 | Proper et al. | |
| 5,989,473 A | * | 11/1999 | Haverty | 264/279 |
| 6,021,270 A | * | 2/2000 | Hanaki et al. | 703/7 |
| 6,454,972 B1 | * | 9/2002 | Morisette et al. | 264/39 |
| 6,678,642 B1 | * | 1/2004 | Budge | 703/2 |
| 6,993,463 B1 | * | 1/2006 | Ewsuk et al. | 703/2 |
| 7,110,921 B1 | | 9/2006 | Kauzlarich | |
| 2004/0230411 A1 | * | 11/2004 | Zheng et al. | 703/6 |
| 2005/0203656 A1 | * | 9/2005 | Ernst et al. | 700/106 |

(Continued)

FOREIGN PATENT DOCUMENTS

WO    WO0015408    3/2000

OTHER PUBLICATIONS

Luo et al., "A Streamline Element Scheme for Solving Viscoelastic Flow Problems, Part II: Integral Constitutive Models", J. Non-Newtonian Fluid Mech., 22, 1986, pp. 61-89.

(Continued)

*Primary Examiner* — Dwin M Craig
(74) *Attorney, Agent, or Firm* — Robert Plotkin, P.C.

(57) ABSTRACT

A system and a method for analyzing and simulating a die swell and flow profile in polymer melt extrusion through a die. The system includes a mesh generator to generate a computational mesh; a pre-processor to obtain die parameters, boundary conditions, polymer melt parameters including rheological characterization and constitutive equations and to generate an input file; a simulator to receive the input file from the pre-processor and process the input data to simulate die swell; a mesh corrector means to analyze the die swell obtained from the simulator and to correct the motion of the computational mesh and polymer melt to converge the die swell; a post-processor to visualize the die swell and flow profiles for the polymer melt; and a database means to store the die swell corresponding to the die, mesh and polymer melt parameters.

13 Claims, 7 Drawing Sheets

U.S. PATENT DOCUMENTS

2006/0223961 A1      10/2006  Mathews et al.
2007/0129919 A1*     6/2007   Toda et al. .................. 703/9
2008/0126046 A1*     5/2008   Yu .............................. 703/9

OTHER PUBLICATIONS

Luo et al., "An Efficient Algorithm for Strain History Tracking in Finite Element Computation of Non-Newtonian Fluids with Integral Constitutive Equations", Int. J. Numer. Meth. Fluids., 11, 1990, pp. 1015-1031.

Dupont et al., "The Vortex Growth of a KBKZ Fluid in an Abrupt Contraction", J. Non-Newtonian Fluid Mech., 29, 1988, p. 81.

Goublomme et al., "Numerical Prediction of Extrudate Swell of a High-Density Polyethylene", J. Non-Newtonian Fluid Mech., 44, 1992, pp. 171-195.

Be'Raudo et al., "A Finite Element Method for Computing the Flow of Multi-Mode Viscoelastic Fluids: Comparison with Experiments", J. Non-Newtonian Fluid Mech., 75, 1998, 1-23.

* cited by examiner

POLYMER MELT EXTRUSION WHICH HAS POTENTIAL USE IN DIE DESIGN

FIELD OF THE INVENTION

This invention relates to the field of polymer melt extrusion.

Particularly, this invention relates to an optimized process to correct the die swell and to design a die used for polymer melt extrusion.

BACKGROUND OF THE INVENTION

In this specification, the following terms have the following definitions as given alongside. These are additions to the usual definitions expressed in the art.

Extrusion is a process used to create objects of a fixed cross-sectional profile in which a material is pushed or drawn through a die of a desired cross-section.

Die is a specialized tool used in the manufacturing industry to shape or cut polymeric materials, metallic materials and the like.

Die swell is the phenomenon by which a polymer after exiting from a die partially recovers or 'swells back' towards the former shape and volume. Die swell occurs when a polymer melt gains uniform velocity across the section after exiting from the die.

Die geometry is the dimensional specification and structure of the die.

Die parameters include die entrance angle, cross-sectional area, length and material of the die.

ALE (Arbitrary Lagrangian Eulerian) framework is a combination of Lagrangian and Eulerian methods implemented for simplifying and solving partial differential equations representing the behavior of any system.

Finite Element Method (FEM) is a numerical technique for finding approximate solutions of Partial Differential Equations (PDE). The solution approach is based either on eliminating the differential equation completely (steady state problems), or rendering the PDE into an approximating system of ordinary differential equations, which are then numerically integrated using standard techniques such as Euler's method, Runge-Kutta and the like.

Mesh is a basic and standard entity used for obtaining numerical solutions of partial differential equations through the finite element method representing the volume/area of the domain of analysis.

Computational mesh geometry represents the volume/area of the domain of analysis.

Extrudate geometry represents the structural specification of the polymer extrudate.

Polymer melt parameters include molecular weight, branching, viscosity and elasticity of the polymer.

Rheological characterization is the experimental characterization of a material's rheological behaviour. Rheology is the relation of the flow or deformation behaviour of a material and in reaction to applied external forces.

Constitutive equation is a relation between two physical quantities which are specific to a material or substance, and approximates the response of that material to external forces. It is combined with other equations governing physical laws to solve physical problems, like the flow of a fluid in a pipe, or the response of a crystal to an electric field.

Polymer melt motion represents the motion of the polymer melt material through the die which is characterized by flow velocity, pressure, stress and the like.

Mesh motion represents the change in the 3-dimensional co-ordinates of the vertices of the computational mesh cells.

A boundary value problem is a differential equation together with a set of additional restraints, called the boundary conditions. A solution to a boundary value problem is a solution to the differential equation which also satisfies the boundary conditions.

Pharr-Thien Tanner (PTT) model is a simple model used to simulate the rheological behaviour of polymer melts and concentrated solutions. The PTT model is derived from the network theory proposed by Phan-Thien and Tanner in 1977. The PTT model has found widespread use in numerical simulations of the flow of polymer solutions and melts. It is shown to be an excellent simple differential model for the elongational properties of polymer solutions (as published in the journal of International Congress on Rheology, Cambridge, UK, 2000 in the article-'Phan-Thien Tanner flow in concentric annuli').

Godunov update scheme is a conservative numerical scheme, suggested by S. K. Godunov in 1959, for solving partial differential equations. In this method, the conservative variables are considered as piecewise constant over the mesh cells at each time step and the time evolution is determined by the exact solution of the Riemann problem at the inter-cell boundaries (as established by Hirsch, 1990). A Riemann problem, named after Bernhard Riemann, consists of a conservation law together with a piecewise constant data having a single discontinuity.

Lagrangian motion represents the free surface motion of polymer melt simulations in Lagrangian mode. Lagrangian framework is a differential equation whose solutions are the functions for which a given functional is stationary. The simpler representation of the polymer constitutive equations in a Lagrangian framework typically avoids the difficulties associated with convective terms thereby resulting in a robust numerical formulation.

Through the polymer melt extrusion process, very complex cross-sections of polymeric plastics can be created. Finished parts can be formed with an excellent surface finish. Extrusion can be continuous (theoretically producing indefinitely long material) or semi-continuous (producing many pieces). The polymer extrusion process is done in a molten state.

Polymer melt extrusion processes are widely used in the synthetic polymer industries and involve flow of viscoelastic polymeric fluids through complex flow geometries. Viscoelasticity is the property of materials that exhibits both viscous and elastic characteristics when undergoing deformation. Viscous materials, like synthetic and natural polymers, resist shear flow and develop strain with time when a stress is applied. Elastic materials strain instantaneously when stretched and quickly return to their original state once the stress is removed. Viscoelastic materials have elements of both of these properties and exhibit time dependent strain.

Die swell, also known as an extrudate swell, is a common phenomenon in polymer processing. The swelling of polymer extrudate is due to a fading memory effect of viscoelastic polymer melt. Die swell occurs in instances of polymer extrusion, in which a stream of polymeric melt is forced through a die. Die swell is a phenomenon directly related to entropy and the relaxation of the polymer within the flow stream after exiting from the die when external constraints to flow cease to exist. When polymer melt is extruded, it is subjected to an increased flow rate, due to which the polymer chains get stretched. Physical entanglements may relax, if the time scale of the polymer within the die is long enough. When the polymer stream leaves the die, the remaining physical entanglements cause the polymers in the die stream to regain a portion of its former shape by relaxation of the stretched chains, in order to return to the original conformation that minimizes the entropy.

Computational calculation of the die swell of the polymer melt in an extrusion process is important for appropriate die design in profile extrusion applications. This is a challenging task due to the requirement for simulation of the free surface which needs special techniques in the traditionally used Eulerian framework. The degree of swell depends on the coupling between the shear and extensional viscosity of the polymer melt which is modelled by complex constitutive equations having convective derivatives of stress.

Hence it is appropriate to have a better understanding of this flow behavior of the polymer melt and resulting swell which can ultimately lead to improvements in the understanding of the extrusion process, for optimization of both the die design and the processing parameters. Therefore, there is a need to have a tool and a method for simulation of the die swell using a technique which provides advantages of both Lagrangian and Eulerian frameworks by allowing the computational mesh to move in an arbitrary manner, independent of the material motion.

Existing Knowledge:

Most of the numerical studies on die swell reported are based on the Streamline Finite Element Method (SFEM) introduced by Luo and Tanner [as published in 'A streamline element scheme for solving viscoelastic flow problems. Part II. Integral constitutive models', J. Non-Newtonian Fluid Mech. 22 (1986) 61-89] which offers a simple algorithm for solving integral constitutive equations and is suitable for the extrusion operation.

SFEM was subsequently modified by Luo and Mitsoulis [as published in 'An efficient algorithm for strain history tracking in finite element computation of Non-Newtonian fluids with integral constitutive equations', Int. J. Numer. Meth. Fluids. 11 (1990) 1015-1031], who introduced a particle-tracking scheme on the streamline by using Picard iterative scheme which decouples the computation of the free surface shape from that of velocity and stress fields. They used the iterative method of Dupont and Crochet [as published in 'The vortex growth of a KBKZ fluid in an abrupt contraction', J. Non-Newtonian Fluid Mech., 29 (1988) 81] in which the strain history of the material particles was calculated along streamlines.

Several features of the earlier numerical method have been modified by Goublomme et al. [as published in 'Numerical prediction of extrudate swell of a high-density polyethylene', J. Non-Newtonian Fluid Mech. 44 (1992) 171-195] to simulate at high shear rates by introducing a fourth-order Runge-Kutta algorithm to calculate the path lines and the strains within the parent element. The iterative algorithm was of the incremental loading type, where a numerical parameter controls the transformation of a Newtonian solution into a viscoelastic one. The algorithm developed by Goublomme et al. to simulate swell is used in the commercial software POLYFLOW®.

A few researchers have employed the Newton iterative scheme to compute the free surface shape simultaneously with velocity and stress values (coupled method). Be'raudo et al. [as published in 'A finite element method for computing the flow of multi-mode viscoelastic fluids: comparison with experiments', J. Non-Newtonian Fluid Mech. 75 (1998) 1-23] used the finite element method based on Newton's iterative scheme and on discontinuous approximations of the extra-stress tensor. The discontinuous interpolation eliminated the stress variable at the element level by means of a static condensation technique. Simple computation of the stream function which allows the determination of the free surface was used.

All these methods were based on the finite element technique in the Eulerian framework using streamlines/steam tube to compute the swell. The free surface was computed by the predictor corrector technique based on the streamline method and only steady state die swell simulation was possible.

The die swell simulations in Lagrangian framework had an advantage since the surface evolves naturally with the material flow. But there were problems associated with mesh distortion and frequent remeshing was required.

There are patents and patent applications which disclose methods of analysis and correction of die swell.

For instance, U.S. Pat. No. 5,874,034 discloses a method and apparatus for extruding viscoelastic polymers. This patent discloses an extrusion die for manufacturing viscoelastic and similar polymers while reducing or eliminating the die swell. The method and apparatus can be used to manufacture a xerographic toner that has a relatively low melting temperature, which can cause a reduction in the power consumption of a printer or copier. Use of toner particles created using the disclosed technique can reduce or eliminate the phenomenon known as "vinyl off set," which causes the transfer of a hard copy image onto a vinyl material. The method disclosed in this patent does not provide a reliable method to calculate the die swell. The reduction of die swell is dependent on the toner particles and there is no correction mechanism for the die swell caused by any characteristic change of the toner particle.

Similarly, PCT application WO00015408 discloses a system and a method for generating die swell/draw down information for a profile extrusion die design. The system employs a rheometer; a slit die and puller mechanism to obtain the die swell/draw down information and a processor which uses this information to generate a die design chart which will help in the design of a profile extrusion die. The drawback of the disclosed method is that any real-time dynamic die swell correction is not possible.

Further, U.S. Pat. No. 7,110,921 discloses a method for designing a profile extrusion based on the analogy that exists between membrane deflection under pressure and low Reynolds number pressure driven fluid flow. The relative shape of the die is predicted using the analogy for die swell correction. A drawback of the disclosed method is that the analogy is not strong enough to give accurate die swell predictions for all polymer materials and flow rate as the disclosed method can only be used for low Reynolds number pressure driven fluid flow.

Finally, US Patent application 20060223961 discloses a method for selecting a polyolefin having a die swell within a pre-selected range. The method includes i) obtaining a data set for at least one property from plurality of polyolefin batches of reference samples, other than die swell, of the polyolefin; ii) obtaining a die swell data set from the reference samples of the polyolefin; iii) correlating at least one property and the die swell data set using a regression analysis to generate an equation for predicting the die swell as a function of at least one property. The die swell prediction is not authenticated as it is based only on a single property. The die swell is affected by a plurality of parameters of the die and the polymer melt.

Therefore, there is a need for:

a simple and reliable system to analyze die swell;

a system to calculate accurate die swell taking all parameters of the die and polymer melt that can affect the die swell into consideration;

a system to calculate and correct the die swell dynamically; and a system to store the die swell corresponding to the predetermined die and melt parameters and profiles.

OBJECTS OF THE INVENTION

It is an object of the present invention to simulate the die swell in polymer melt extrusion.

It is another object of the present invention to accurately calculate the die swell which is needed for die designing applications.

It is still another object of the present invention to provide a numerical tool for simulating the die swell and flow of complex polymer melt during extrusion.

It is still another object of the present invention to provide a simple and convenient method to solve the complex viscoelastic constitutive equations for die swell calculations.

It is still another object of the present invention to control the die swell of any extrudate profile like a sheet, tube, rod and the like in the process of polymer extrusion.

It is still another object of the present invention to optimize the polymer extrusion process and the process parameters to get the desired product dimensions.

It is still another object of the present invention to provide a system wherein the system analyzes the flow profile for any polymer material, particularly flows with strong memory.

Yet another object of the present invention is to provide a system wherein said system calculates the die swell for high extrusion rate and to solve the complex viscoelastic equations for the polymer melt along with the flow kinematics in an effective manner.

One more object of the present invention is to accurately calculate the die swell transiently.

Again, another object of the present invention is to provide a simple and reliable system to accurately calculate the die swell considering the die geometry, and polymer melt characteristics.

SUMMARY OF THE INVENTION

In accordance with preferred embodiment of the present invention, there is provided a system for analyzing and controlling the die swell and the flow profile in polymer melt extrusion through a die, said system typically comprising the following:

a mesh generator adapted to generate a computational mesh mathematically representing the actual die geometry;

a pre-processor adapted to prescribe die parameters, boundary conditions, polymer melt parameters including rheological characterization and constitutive equations and to generate an input file;

a simulator adapted to receive the input file from the pre-processor and process the input data to simulate die swell;

a mesh corrector means adapted to analyze the die swell obtained from said simulator and to correct motion of the computational mesh and polymer melt to simulate the die swell accurately;

a post-processor means adapted to visualize the die swell and flow profiles for the polymer melt; and a database means adapted to store the die swell corresponding to the die, mesh and polymer melt parameters.

Typically, the mesh generator is adapted to convert the die geometry to a computational mesh geometry.

Typically, the pre-processor has means adapted to transfer the input file containing die geometry (mesh), boundary conditions and material parameters to the simulator.

Preferably, the simulator is based on Arbitrary Lagrangian Eulerian (ALE) finite element method adapted to analyze the die swell.

Preferably, the ALE simulator has means adapted to compare the analyzed die swell with the stored die swell in the database for the given polymer, flow rate and die profile to obtain the accurate die swell.

In accordance with the preferred embodiment of the present invention, the system includes an editor means to edit said database whenever said system works on new melt, mesh or die parameters and profiles.

Typically, said system includes an editor means to edit said database after the die swell is analyzed.

In accordance with the preferred embodiment of the present invention, there is provided a method for analyzing the die swell of the polymer extrudate and the flow profile in polymer melt extrusion through a die using a computational mesh, comprising the following steps:

obtaining the die parameters and storing these parameters in a database;

obtaining the polymer melt/material parameters from rheological measurements and storing these parameters in a database experimentally determining correlation between the parameters and the die swell for predetermined parameters and storing the determined die swell in the database;

generating a computational mesh representing the die geometry and extrudate geometry;

formulating complex constitutive equations using the polymer melt parameters;

analyzing the complex constitutive equations of the polymer melt using ALE simulation wherein the polymer melt and mesh motion are decoupled;

solving the complex constitutive equations using the Pharr Thien Tanner model;

solving the convective terms of constitutive equations using Godunov update scheme;

simulating the free surface flow of the polymer melt using Lagrangian motion as the free surface evolves naturally with the polymer melt flow;

calculating the die swell based on the analysis and solution of the constitutive equations; and correcting the mesh and the polymer melt motion until there is no further significant change in the calculated die swell.

Typically, the die parameters are obtained from physical measurements of the actual die geometry used in the polymer melt extrusion process.

Typically, the die swell is calculated for any extrudate material profile.

Preferably, the extrudate material profile includes sheet, tube and rod.

Typically the calculated die swell is used to alter the parameters of a die to get a desired extrudate material profile.

Typically, the alteration of the die parameters results in a die geometry consisting of planar or axisymmetric contraction ratio and die length.

Typically, the step of calculation of die swell computes the transient die swell (that is the evolution of die swell as function of time) of polymer melt flow in extrusion.

Typically, the step of calculation of die swell computes die swell for high extrusion rate.

Typically, the polymer material is selected from a group of polymer materials consisting of linear and branched polymer resins of polycarbonates, polyesters, polyimides, olefins, polyetherimides, polyamides, polyarylenesulfides, polysulfones, polyetherketones, acrylonitrile butadiene styrene copolymers, polystyrenes and blends, compositions or copolymers prepared therefrom and other polymers materials such as glass or wood filled polymers.

BRIEF DESCRIPTION OF THE ACCOMPANYING DRAWINGS

The simulation of die swell in accordance with the present invention can be described with the help of the accompanying drawings.

DETAILED DESCRIPTION OF THE ACCOMPANYING DRAWINGS

In accordance with the preferred embodiment of the present invention, a system is provided for analyzing and controlling the die swell and flow profile in the polymer melt extrusion process.

Figure 1:
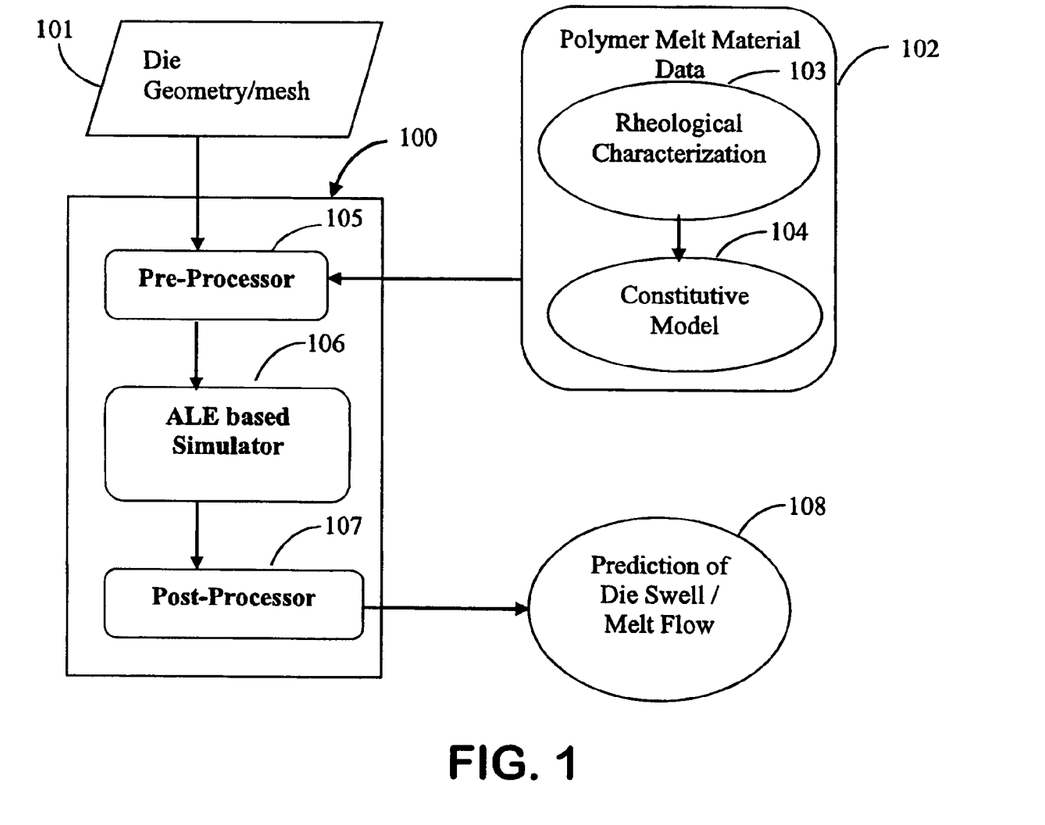
FIG. 1 is a schematic diagram illustrating ALE based finite element tool for the analysis of die swell.

The preferred embodiment of the present invention for die swell simulations is based on the Arbitrary Lagrangian Eulerian (ALE) finite element technique. ALE framework is a combination of Lagrangian and Eulerian methods implemented for simplifying and solving partial differential equations representing the behaviour of any system. Finite element method (FEM) is a numerical technique for finding approximate solutions of partial differential equations (PDE) as well as of integral equations. U.S. Pat. No. 5,569,860 discloses optimum conditions for extrusion forging using a powder material. A simulation analysis is carried out by Arbitrary Lagrangian Eulerian method to determine the optimum conditions for powder forging, but no die swell analysis is mentioned. A journal paper on simulation of viscoelastic flows of polymer solutions in abrupt contractions using an arbitrary Lagrangian Eulerian (ALE) based finite element method, presented a basic technique for contained flows but does not deal with free surface or die swell analysis [as published in 'Ganvir et al.—Simulation of viscoelastic flows of polymer solutions in abrupt contractions using an arbitrary Lagrangian Eulerian (ALE) based finite element method, J. Non-Newtonian Fluid Mech. 143 (2007) 157-169']. In accordance with the preferred embodiment of the present invention, the flow diagram of the ALE based methodology implemented in the present invention for polymer melt flow in extrusion is shown in FIG. 1. The system typically has:

a computational mesh and a die where the mesh converts the die geometry to mesh geometry as shown by block 101 of FIG. 1;

a pre-processor as shown by block 105 of FIG. 1 which takes all input parameters such as the die geometry as mesh, boundary conditions and polymer melt parameters (as shown by block 102 in FIG. 1) including the rheological characterization (as shown by block 103 in FIG. 1), the constitutive equations (as shown by block 104 in FIG. 1) and the like. The pre-processor receives all parameters through user input. User obtains the parameters through physical measurements of the actual die geometry used in the polymer melt extrusion process.

an ALE simulator as represented by block 106 in FIG. 1 which receives input from the pre-processor. The simulator includes computational means which analyses the die swell; and a post-processor as represented by block 107 in FIG. 1 wherein the analysis results are visualized where the output is represented by block 108 in FIG. 1.

Formulations based on Arbitrary Lagrangian Eulerian (ALE) methods typically support independent mesh movement with respect to the polymer melt material leading to numerous variations that can be tailored for specific needs. Free surface simulations of swell using the ALE technique can be easily done in Lagrangian mode since it involves tracking the motion of material. The simpler representation of the polymer constitutive equations in a Lagrangian framework typically avoids the difficulties associated with convective terms thereby resulting in a robust numerical formulation. This ALE technique is easy to implement and can accurately simulate the complex viscoelastic behavior of transient polymer flow through complex geometries. The strength of ALE formulation is demonstrated for the simulations of polymer flow with free surfaces. In the ALE based die swell simulation, the free mesh is allowed to move normal to flow direction. The differential exponential Pharr Thien Tanner (PTT) polymer constitutive model is used to capture the melt flow and die swell. U.S. Pat. No. 5,926,393 discloses a method for designing a profile extrusion die for shaping a polymer resin material into a profile having a plurality of sections. This invention provides a computer implemented methodology for designing an extrusion die plate that shapes a polymer resin material into a profile. The viscoelastic model of this invention is based on the differential PTT model. But PTT is not used in ALE simulation of die swell as yet.

The Arbitrary Lagrangian Eulerian (ALE) formulation of continuum mechanics has been developed to overcome the limitations of the Lagrangian and Eulerian formulations. Specifically, the central idea implemented is to allow the computational mesh to move in an arbitrary manner, independent of the material motion [as published in 'T. Belytschko, W. K.

Liu, B. Moran-Nonlinear Finite Elements for Continua and Structures, John Wiley & Sons, New York, 2000, Chapter 7']. This arbitrariness can be used to reduce the extent of convection between the mesh and material motion. For the ALE formulation, one to one trans formation between the material of polymer melt and mesh domains is required. The material velocity v and mesh velocity v m are given by $$v = \frac{\partial x(X, t)}{\partial t}\bigg|_x, \quad v_m = \frac{\partial x(\chi, t)}{\partial t}\bigg|_\chi \quad (1)$$

The convective velocity c, which is the relative motion between material particle and mesh, is given by $$c = v - v_m \quad (2)$$

This leads to a relationship between time derivatives in material and referential (mesh) domains for any given scalar variable f as $$\frac{\partial f}{\partial t}\bigg|_x = \frac{\partial f}{\partial t}\bigg|_\chi + c_i \frac{\partial f}{\partial x_i} \quad (3)$$

Equation (3) forms the basic foundation of the ALE formulation. In an ALE fractional-step method, the Lagrangian phase of polymer melt motion and convection due to subsequent mesh motion are treated separately which can be termed as decoupling of polymer melt and mesh motion [as published in 'A. Rodriguez-Ferran et al.—ALEstress update for transient and quasistatic processes, Int. J. Num. Meth. Eng. 43 (1998) 241-262']. This eliminates convective terms in the viscoelastic stress constitutive equation while solving for flow in the Lagrangian phase. The convection phase of the stress update can be performed using explicit algorithms, like Godunov update scheme for ALE analysis. A detailed presentation of the ALE technique for viscoelastic flow is given by Ganvir et al.

Figure 2:
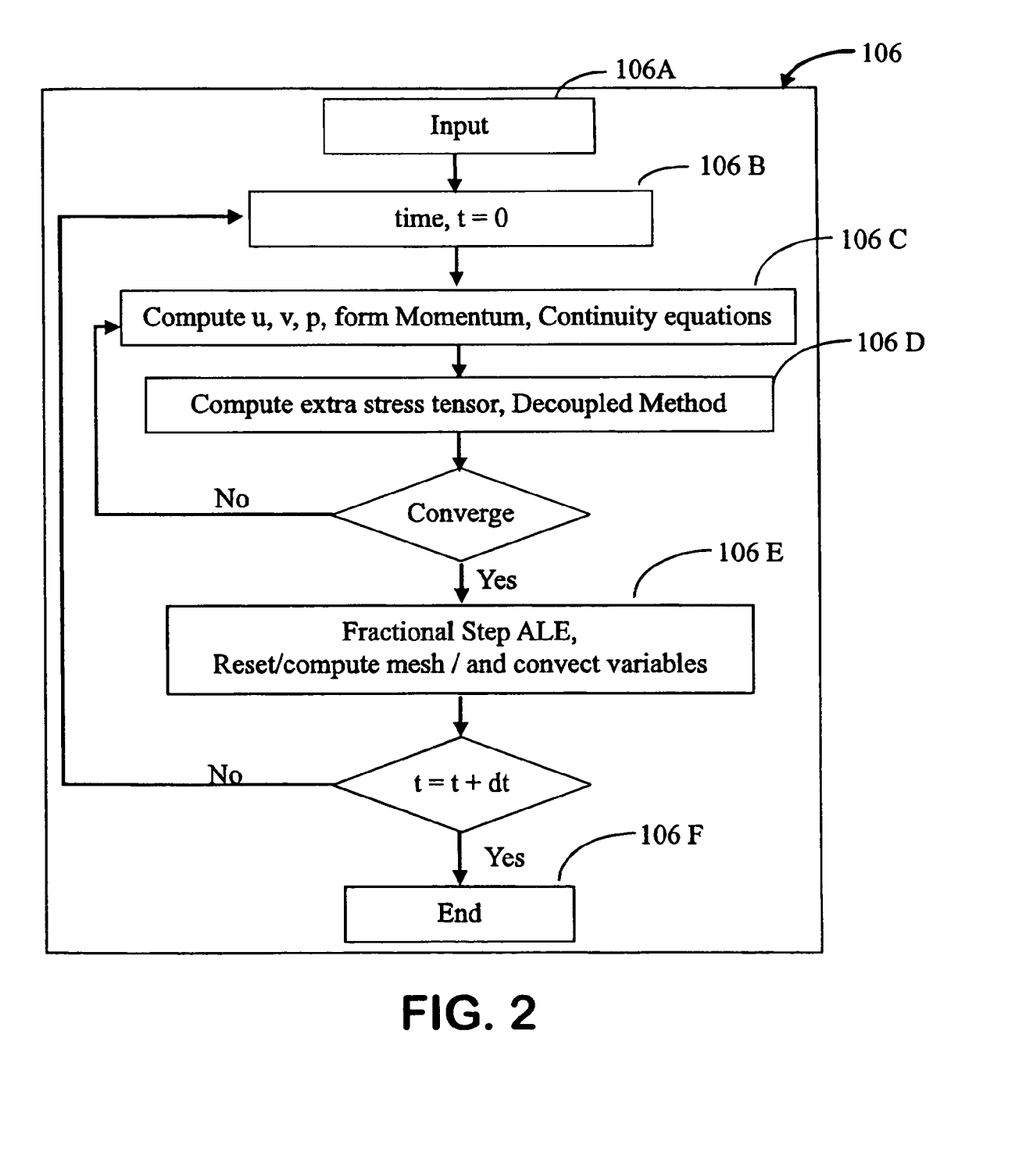
FIG. 2 is a schematic diagram illustrating ALE based simulator.

In accordance with the preferred embodiment of the present invention, the flow chart of the ALE based methodology is shown in FIG. 2. The typical steps followed are given by:
- receiving the set of input parameters from the pre-processor as shown by block 106A of FIG. 2;
- starting the simulation at a point of time represented by t=O as shown by block 106B of FIG. 2;
- computing the different parameters of polymer melt flow like initial velocity, final velocity, and the like and solving the continuity and momentum equations as shown by block 106C of FIG. 2;
- computing the extra stress tensor by decoupling the flow and stress computation as in Picard method as shown by block 106D of FIG. 2;
- correcting the mesh and the melt flow based on the analysis obtained from the ALE simulation method as shown by block 106E of FIG. 2; and
- giving the output for visualization to the postprocessor at the end of processing as shown by block 106F of FIG. 2.

The equations governing the laminar flow of an incompressible viscoelastic fluid are $$\overline{\nabla} \cdot v = 0 \quad (4)$$

$$-\overline{\nabla} p + \overline{\nabla} \cdot a = \sigma \quad (5)$$

where v is the velocity, p is the pressure and a is stress tensor. Inertial terms are neglected in Equation (5). For a viscoelastic fluid the stress tensor is expressed as a sum of Newtonian and viscoelastic components $$\sigma = \tau_s + \tau_v \quad (6)$$

Here $\tau_v$ is the extra stress tensor due to viscoelasticity and $\tau_s$ is the stress component of a Newtonian fluid given by $$\tau_s = \eta_s D; \quad D = (\overline{\nabla}_v + \overline{\nabla}_v^T) \quad (7)$$

The extra stress tensor is described by a constitutive model. The use of multi-mode exponential PTT model for describing shear thinning viscoelastic fluids is illustrated below. Any other differential constitutive model can be utilized in its place. The extra stress tensor is then given by $$\tau_v = \Sigma \tau_{vi} \quad (8)$$

where the stress contribution of the $i^{th}$ mode is given by the exponential PTT model as $$\lambda_i \overset{\nabla}{\tau}_{vi} + f(Tr[\tau_{vi}])\tau_{vi} + f_d(\tau_{vi}) = \eta_{vi} D \quad (9)$$

In Equation (8) the upper convected derivative $\tau_{vi}^{\nabla}$ is given by $$\overset{\nabla}{\tau}_{vi} = \frac{D\tau_{vi}}{Dt} - \tau_{vi} \nabla v - \nabla v^T \tau_{vi} \quad (10)$$

The functions $f(Tr[\tau_{vi}])$ and $f_d[\tau_{vi}]$ are given by $$f(Tr[\tau_{vi}]) = \exp\left(\frac{\lambda_i \varepsilon}{\eta_v} Tr[\tau_{vi}]\right), \quad f_d(\tau_{vi}) = \xi(D \cdot \tau_{vi} + \tau_{vi} \cdot D) \quad (11)$$

In the above equations the model parameters are the relaxation time. $\lambda_i$, the zero shear polymer viscosity. $\eta_v$, the solvent viscosity $\eta_s$ and $\xi$. The total viscosity is given by $\eta_o = \eta_v + \eta_s$.

The above set of equations are solved using a decoupled technique [as published in 'R. Keunings, in C. L. Tucker (Ed)—Computer Modelling of Polymer Processing, Hanser Munich, 1989, Chapter 9'] by considering the influence of viscoelastic stress as an additional external force on Newtonian flow. This leads to the following form to be solved $$\overline{\nabla}_p - \overline{\nabla} \tau_s = \overline{\nabla} \tau_v \quad (12)$$

A nine nodded quadratic quadrilateral isoparametric finite element based on Galerkin weighted residual discretization technique is used. A standard mixed velocity pressure formulation [as published in 'O. C. Zienkiewicz, R. L. Taylor—The Finite Element Method, Volume 1, Butterworth Heinemann, London, 2000'] is used. The continuity equation is augmented by p/γ where: γ is a small penalty parameter. The continuity and momentum equations [Equation (4) and Equation (5)] with the pressure penalty method results in the following discretized form $$\begin{bmatrix} K & -G \\ -G^T & -\frac{h^2}{\gamma} I \end{bmatrix} \begin{Bmatrix} v \\ p \end{Bmatrix} = \begin{Bmatrix} f \\ 0 \end{Bmatrix} \quad (13)$$

where h is the size of element, I is identity matrix and $h^2/\gamma$ is the penalty number (of the order of $10^7$-$10^8$). The matrices K and G are given by $$K = \int_\Omega B^T \eta_s I B d\Omega \quad G = \int_\Omega (\nabla N^v)^T N^p d\Omega \tag{14}$$

Here B is the strain-displacement relation matrix, $N^v$ and $N^P$ are the velocity and pressure shape functions respectively. The force vector f is given by $$f = \int_{\Gamma_f} (N^v) T_s d\Gamma - f_{ve} \tag{15}$$

Where $T_s$ is the surface traction on boundary and $\Gamma_f$, and $f_{ve}$ the force term arising out of extra viscoelastic stress, given by $$f_{ve} = \int_\Omega B^T T d\Omega \tag{16}$$

Here T is the vector representation of viscoelastic extra stress $\tau_v$.

The first iteration of a given time step takes the previous converged viscoelastic stress as the initial guess. The iterations are repeated until convergence, the criteria for which is defined as $$v_{norm} = \sqrt{\frac{(v_{i+1}^n - v_i^n)^2}{(v_{i+1}^n)^2}} < 10^{-7} \tag{17}$$

The constitutive relation for viscoelastic stress is integrated in time by first expressing the Lagrangian time derivative of $\tau_v$ at the n+1$^{th}$ step as $$\frac{D\tau_v}{Dt} = \frac{\tau_v^{n+1} - \tau_v^n}{\Delta t} \tag{18}$$

and then substituting the left side of Equation (18) from Equation (9) and Equation (10).

The ALE Convection Phase

The governing equation in ALE phase [Equation (3)] is given by $$\left.\frac{\partial \tau}{\partial t}\right|_\chi + c_i \frac{\partial \tau}{\partial x_i} = q \tag{19}$$

where c is the convective velocity given by Equation (3) and q accounts for material stress state [Rodriguez-Ferran et al.]. In view of the decoupled approach the right side of the Equation (19) for the convection phase post Lagrangian phase reduces to zero. Hence for each stress component, Equation (19) can be written as $$\left.\frac{\partial \tau}{\partial t}\right|_\chi + c_i \frac{\partial \tau}{\partial x_i} = 0 \tag{20}$$

which has to be integrated to update stress from the Lagrangian phase to mesh transport phase. Since the convection term is involved, some type of upwinding is needed to handle Equation (20). To avoid the computing gradient of discontinuous stress field at the element level a Godunov like update procedure which assumes a piecewise constant field for stress is used. A detailed presentation of the Godunov update method is given by Rodriguez-Ferran et al.

The ALE methods typically pertain to cases where the boundary of the domain for the mesh and material are identical. In accordance with the preferred embodiment of the present invention, the melt flow through a spatially fixed window for die geometry and free surface flow at the die exit (FIG. 3) is analyzed. No slip boundary conditions are applied on the die wall and fully developed flow boundary condition is assumed at the inlet of the die. For free surface analysis, it is assumed at the beginning of the simulation the existence of an extrudate of the same width/radius as the die exit and of finite length. A zero force boundary condition is considered on the free surface.

Preferably, the system includes an editor means to edit the database storing die swell corresponding to a set of die melt and mesh parameters, whenever said system works on new melt, mesh or die parameters and profiles.

Figure 3:
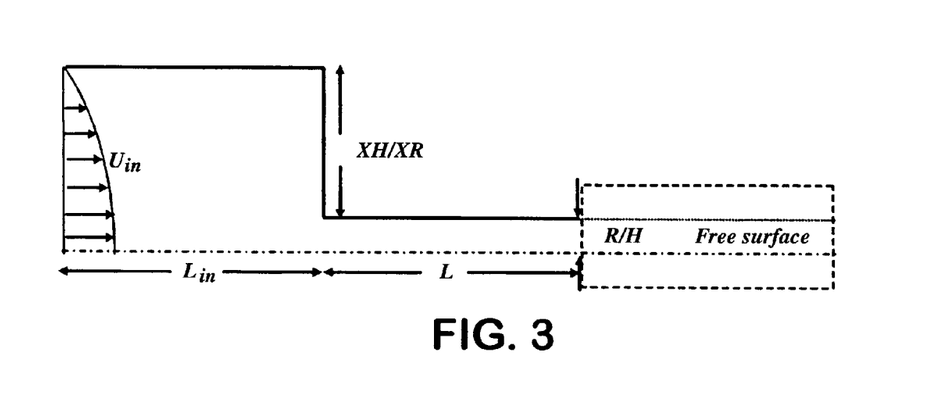
FIG. 3 is a schematic diagram illustrating the die geometry and applied boundary conditions.
Figure 4:
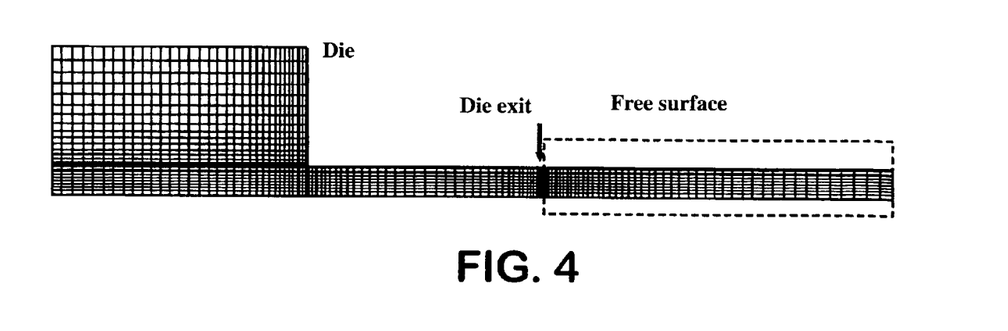
FIG. 4 is a diagram illustrating the computational mesh based on die geometry used for simulations.

A mesh is generated based on the same geometry obtained as a result of the analysis as shown in FIG. 3. A typical mesh for contraction geometry is shown in FIG. 4. The mesh dependent studies were carried out by selecting different element size. The effect of element size on the die swell calculation was done. The size of element is selected to be sufficiently small at die exit to get die swell calculations accurately.

The following examples are illustrative of the invention which are compared with the experimental data reported in the literature and also generated by conducting experiments but not limited to the scope thereof.

EXAMPLES

Example 1

Die Swell Analysis of LLDPE Melt for a Long Capillary Die

Figure 5:
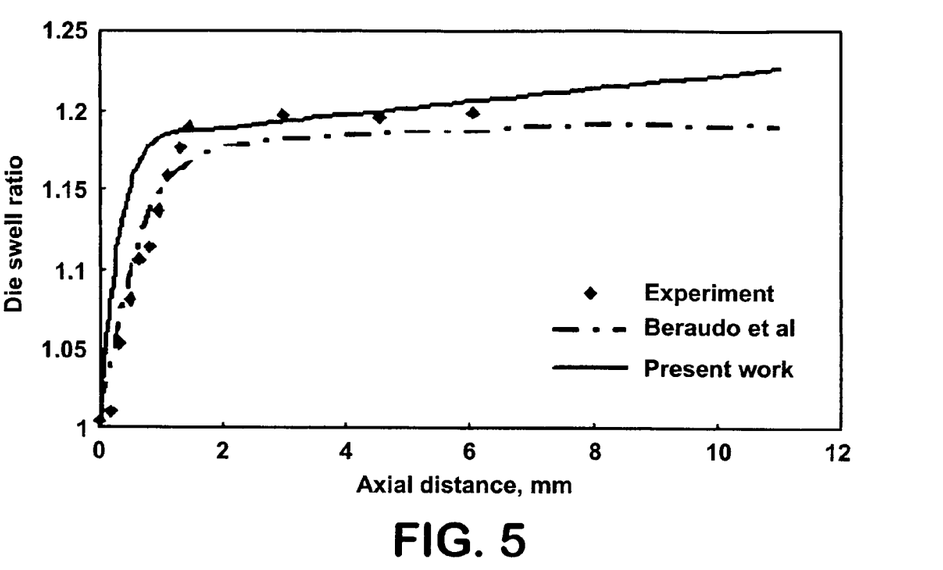
FIG. 5 is a plot showing the comparison with experiments and simulation of die swell for long axisymmetric die at extrusion rate of 3.3 $s^{-1}$.
Figure 6:
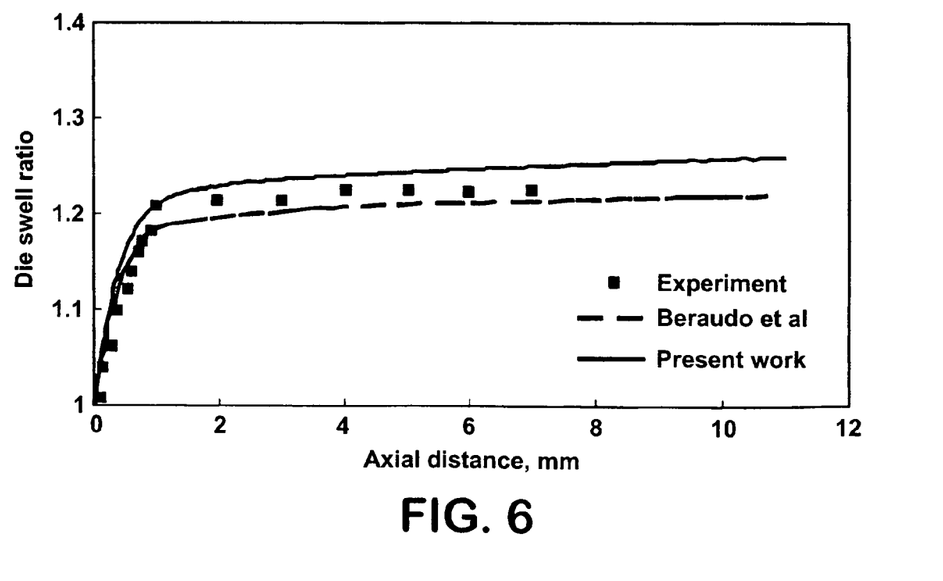
FIG. 6 is a plot showing the comparison with experiments and simulation of die swell for long axisymmetric die at extrusion rate of 11 $s^{-1}$.
Figure 7:
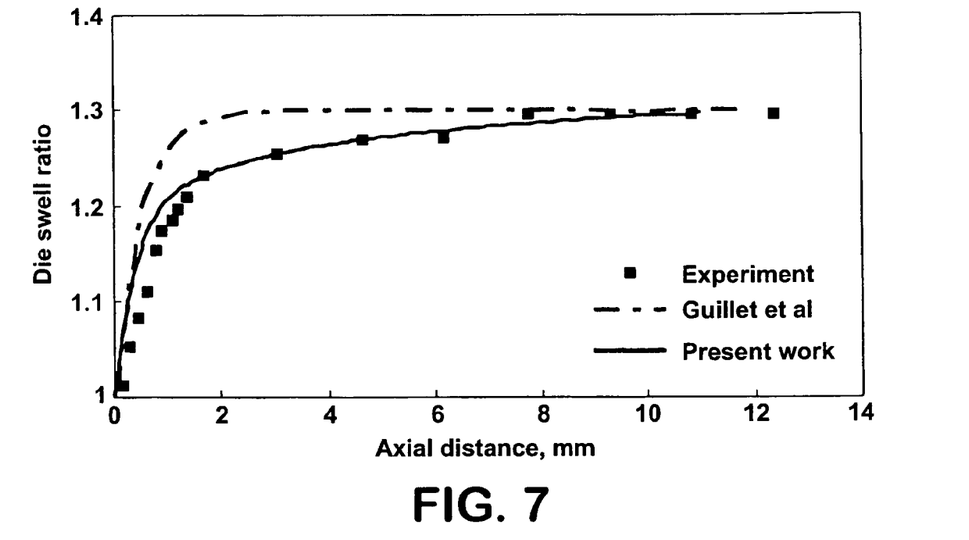
FIG. 7 is a plot showing the comparison with experiments and simulation of die swell for long axisymmetric die at extrusion rate of 33 $s^{-1}$.

Die swell analysis using the present invention through a capillary die of length to diameter ratio, L/D=19.2 were compared with the experiments and predictions of Guillet et al. [as published in: Piau J. M., Agassant J. F. (Eds.) Rheology for Polymer Melt Processing, Elsevier, 1996, p. 285] and Be'raudo eal. While the constitutive model and the values of its parameters were identical to that used by Guillet et al. and Be'raudo et al, the simulation technique (ALE) was different than that used by these authors. Therefore the results provided a direct way of comparing performance of the two types of simulation techniques. The results are shown in FIG. 5, FIG. 6 and FIG. 7 for three different shear rates. ALE based calculations of die swell profile were in good agreement with the experiments at all shear rates.

Example 2

Figure 8:
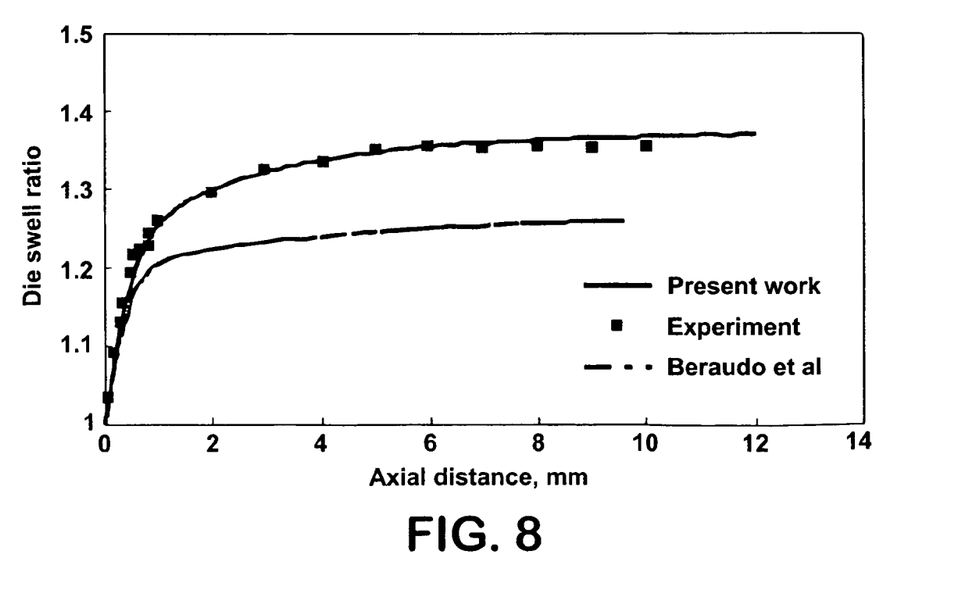
FIG. 8 is a plot showing the comparison with experiments and simulation of die swell for short axisymmetric die at extrusion rate of 33 $s^{-1}$.

Die Swell Analysis for a of LLDPE Melt Short Die with an Upstream Axisymmetric Contraction-Large Memory The calculations based on the present invention were compared with the experiments of Guillet et al. and simulations of Be'raudo et al. for extrusion of LLDPE from a short capillary die having length to diameter ratio (L/D)=4.8 and D=0.65 mm. In this simulation the entire die geometry including the converging section of the die was considered. The simulation results shown in FIG. 8 compared better with experiments than those of Be'raudo et al.

Example 3

Die Swell of HDPE from a Planar Die

ALE based die swell results of simulations were compared with the simulations results and experiments of Ahmed et al. [as published in 'The experimental observation and numerical prediction of planar entry flow and die swell for molten polyethylenes, J. Non-Newtonian Fluid Mech. 59 (1995) 129-153'] for Natene grade HDPE through a planar contraction. The die dimensions used in the simulations were the same as those reported by Ahmed et al. For the simulations using the present invention, the exponential PTT constitutive model was used, while Ahmed et al. used the KBKZ model with Wagner damping parameter, k=0.35. The PTT model parameter, E was estimated to be 0.27. The swell ratio i.e., the thickness of the extrudate to the slit thickness at die exit was computed at a distance of 2 mm from the die exit. The results are shown in Table 1. The analysis of swell using the present invention had shown a better match with the experimental data.

TABLE 1

| | Die swell ratio | | |
|---|---|---|---|
| Flow rate (g/s) | Experiments* | Ahmed et al. | Present work |
| 0.22 | 1.46 | 1.58 (+8.2%) | 1.40 (−4.1%) |
| 0.32 | 1.46 | 1.57 (+7.5%) | 1.43 (−2.1%) |

*measured at 2 mm from die exit.

Experiments for Further Comparison

Figure 9:
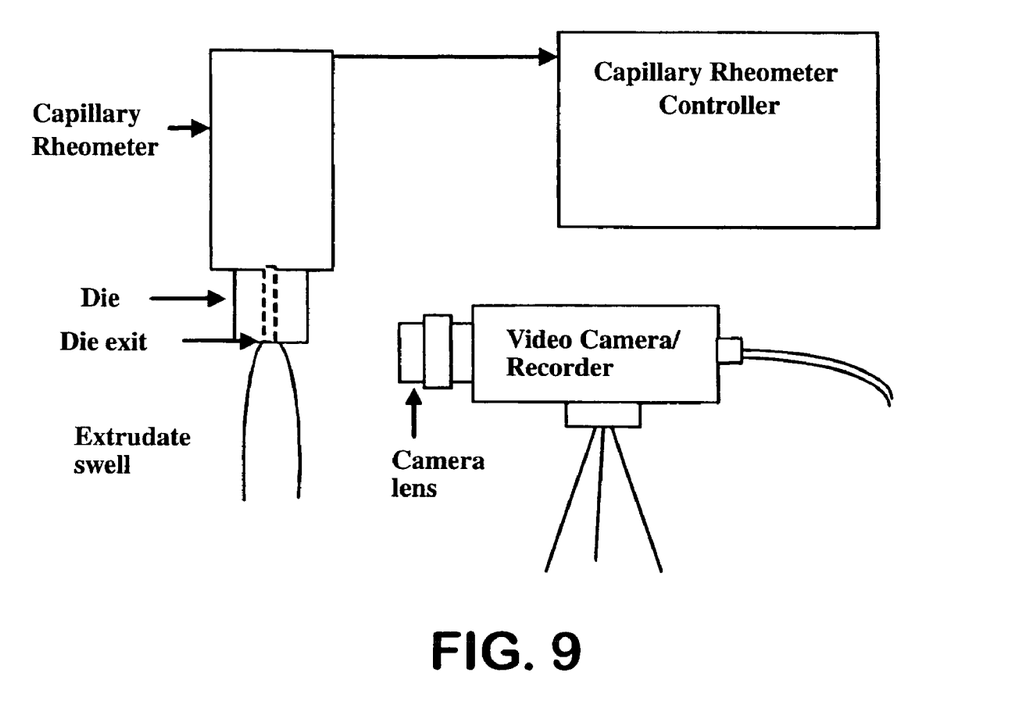
FIG. 9 is a diagram illustrating experimental setup for extrudate swell.
Figure 10:
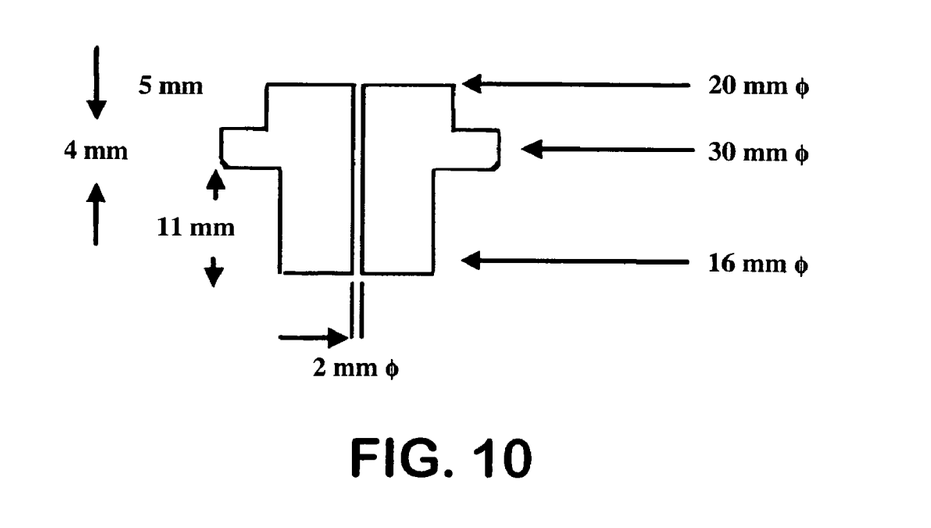
FIG. 10 is a schematic diagram illustrating short die.

The experimental set-up had capillary rheometer with controller, die and video camera/recorder with lens as shown in FIG. 9. The extrudate swell experiments were performed on a CEAST capillary rheometer using an axisymmetric die for short and long die. The diameter of the barrel of the capillary rheometer was 20 mm. The diameter (D) of short die and long die was 2 mm while the die lengths (L) were 20 and 60 mm respectively. The short (shown in FIG. 10) or long die was fitted to the capillary rheometer assembly. The polymer pellets were filled into the bore of the capillary rheometer and melted at the set (extrusion) temperature. The prescribed temperature and the piston displacement were controlled through the rheometer controller. The polymer was extruded through the die at set temperature and the set piston speed (shear rate). The polymer material used was LLDPE-2045G supplied by DOW chemicals. The polymer was melted at 190 C and then extruded through the die. The extrudate polymer swelled (die swell) and this swelling was captured using video camera and a recorder. The captured images were then used as experimental data for the die swell.

Example 4

Die Swell Analysis of LLDPE-2045 Melt for a Long Capillary Die

Figure 11:
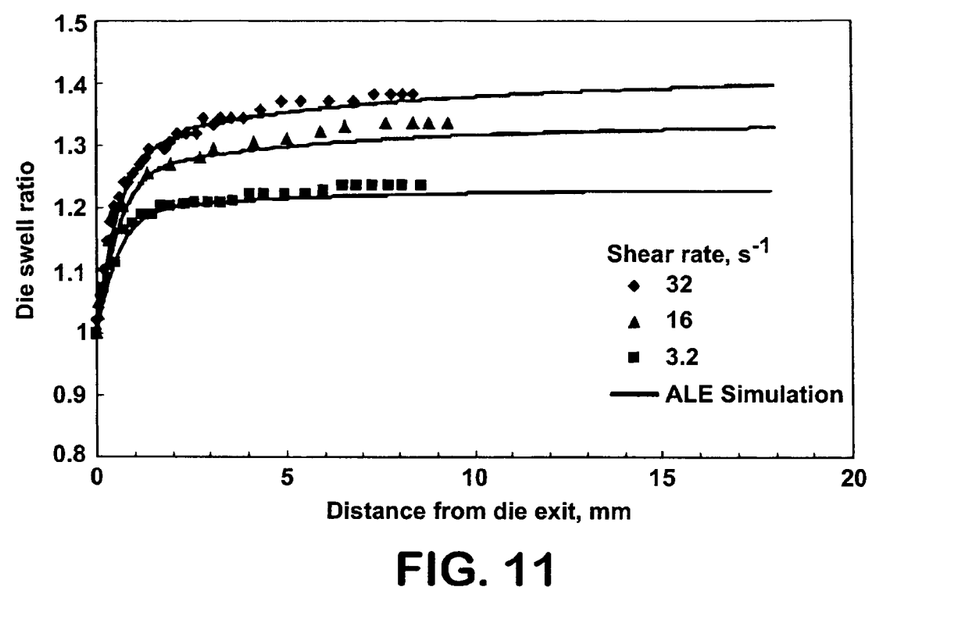
FIG. 11 is a plot showing comparison with experiments for LLDPE-2045G and long die at shear rates of 3.2, 16, 32 $s^{-1}$.

ALE based die swell simulations through a capillary die of length to diameter ratio, L/D=30 and D=2 mm were done. These were compared with the previous experiments on the die swell. The PTT constitutive model was used and model parameters were determined by fitting the experimental data obtained from material characterization. The PTT model parameters, E=0.35 and 1;=0.0 were estimated. These set of material parameters were used as input for the ALE based simulator. The results are shown in FIG. 11, for three different shear rates. It can be seen that ALE based analysis of die swell profile were in good agreement with conducted experiments at all shear rates.

Example 5

Figure 12:
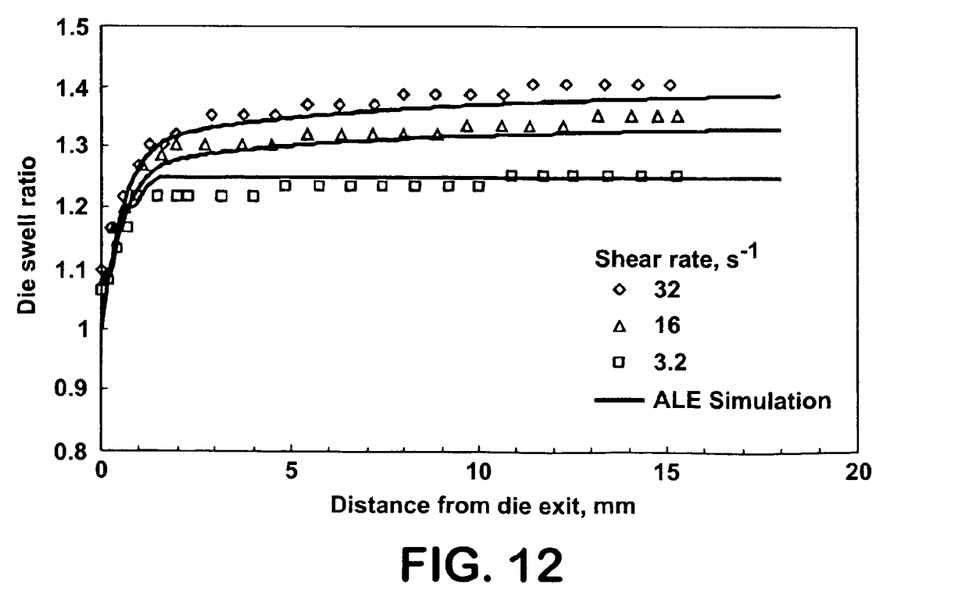
FIG. 12 is a plot showing comparison with experiments for LLDPE-2045G and short die at shear rates of 3.2, 16, 32 $s^{-1}$.

Die Swell Analysis for a of LLDPE-2045 Melt Short Die with an Upstream Axisymmetric Contraction Extrusion of LLDPE 2045 from a short capillary die having length to diameter ratio (L/D)=10 and D=2 mm was done. In this simulation the entire die geometry including the converging section of the die was considered. The simulation results are shown in FIG. 12 wherein the results had shown good match with conducted experiments.

The technical advancements of the present invention include:

Accurate simulation of the die swell which is suitable for die designing applications.

Provision of a simple and reliable numerical tool for simulating the die swell and the flow of complex polymer melt during extrusion using the ALE based finite element method.

Provision of an ALE based simulator tool which introduces a simple and convenient method to solve the complex viscoelastic constitutive equations for die swell calculations.

Provision of analyzing the die swell of any extrudate profile like a sheet, tube, rod and the like in the process of polymer extrusion.

Provision to analyze and control the die swell and polymer melt flow profile transiently.

Provision to optimize the polymer extrusion process and the process parameters to get desired product dimensions.

Provision to analyze the die swell based on all parameters and profile of the die and polymer melt.

Provision to carry out the die swell analysis to generate a die geometry consisting of planar or axisymmetric contraction and die length.

Provision to analyze the transient die swell and die swell evolution as the function of time.

Provision of a system wherein said system is adapted to calculate the flow profile for any polymer material including linear and branched polymer resins of polycarbonates, polyesters, polyimides, olefins, polyetherimides, polyamides, polyarylenesulfides, polysulfones, polyetherketones, acrylonitrile butadiene styrenecopolymers, polystyrenes and blends, compositions or copolymers prepared therefrom and other polymers materials such as glass or wood filled polymers.

Provision of a system wherein said system is adapted to analyze the flow profile for any polymer material particularly flows with strong memory.

Provision of a system wherein said system is adapted to analyze die swell for high extrusion rate and to solve the complex viscoelastic equation for polymer melt along with the flow kinematics.

While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A system for analyzing and controlling the die swell and the flow profile in polymer melt extrusion through a die, said system typically comprising the following:
   a mesh generator adapted to generate a computational mesh mathematically representing the actual die geometry;
   a pre-processor adapted to prescribe die parameters, boundary conditions and polymer melt parameters including rheological characterization and constitutive equations and to generate an input file;
   a simulator adapted to receive the input file from the pre-processor and process the input data to simulate die swell;
   a mesh corrector means adapted to analyze the die swell obtained from said simulator and to correct motion of the computational mesh and polymer melt to simulate the die swell accurately;
   a post-processor means adapted to visualize the die swell and flow profiles for the polymer melt; and
   a database means adapted to store the die swell corresponding to the die, mesh and polymer melt parameters.

2. A system as claimed in claim 1, wherein the simulator is based on Arbitrary Lagrangian Eulerian (ALE) finite element method adapted to analyze the die swell.

3. A system as claimed in claim 1, wherein the ALE simulator has means adapted to compare the analyzed die swell with the corresponding values stored in the database for the given polymer, flow rate and die profile to obtain the accurate die swell.

4. A system as claimed in claim 1, wherein said system includes an editor means adapted to edit said database on realization of the events selected from the group consisting of said system working on new melt, mesh, or die parameters and profiles and after the die swell is analyzed.

5. A method for analyzing a die swell of a polymer extrudate and a flow profile in polymer melt extrusion through a die using a computational mesh, comprising the following steps:
   obtaining die parameters and storing these parameters in a database;
   obtaining the polymer melt parameters from rheological measurements and storing these parameters in a database;
   experimentally determining correlation between said parameters and the die swell for predetermined parameters and storing the determined die swell in the database;
   generating a computational mesh representing the die geometry and extrudate geometry;
   formulating complex constitutive equations using the polymer melt parameters;
   analyzing the complex constitutive equations of the polymer melt using ALE simulation wherein the polymer melt and mesh motion are decoupled;
   solving the complex constitutive equations using the Phan Thien Tanner model;
   solving the convective terms of constitutive equations using Godunov update scheme;
   simulating the free surface flow of the polymer melt using Lagrangian motion as the free surface evolves naturally with the polymer melt flow;
   calculating the die swell based on the analysis and solution of the constitutive equations; and
   correcting the mesh and the polymer melt motion until there is no further significant change in the calculated die swell.

6. The method as claimed in claim 5, wherein said die parameters are obtained from physical measurements of said actual die geometry used in the polymer melt extrusion process.

7. A method as claimed in claim 5, wherein the step of calculation of die swell computes die swell for any extrudate material profile.

8. A method as claimed in claim 5, wherein the step of calculation of die swell computes die swell for any extrudate material profile including a sheet, a tube, and a rod.

9. A method as claimed in claim 5, wherein the calculated die swell is used to alter the parameters of a die to get an optimum extrudate material profile.

10. A method as claimed in claim 5, wherein the calculated die swell is used to alter the parameters of a die to get an optimum extrudate material profile, said alteration of the die parameters resulting in a die geometry consisting of planar or axisymmetric contraction ratio and die length.

11. A method as claimed in claim 5, wherein the step of calculation of the die swell computes die swell for transient polymer melt flow.

12. A method as claimed in claim 5, wherein the step of calculation of the die swell computes the die swell for high extrusion rate.

13. A method as claimed in claim 5, wherein the polymer material is selected from a group of polymer materials consisting of linear and branched polymer resins of polycarbonates, polyesters, polyimides, olefins, polyetherimides, polyamides, polyarylene sulfides, polysulfones, polyetherketones, acrylonitrile butadiene styrene copolymers, polystyrenes and blends, compositions or copolymers prepared therefrom and other polymers materials such as glass or wood filled polymers.

* * * * *